United States Patent [19]

Duffney et al.

[11] Patent Number: 5,441,365
[45] Date of Patent: Aug. 15, 1995

[54] APPARATUS AND PROCESS FOR TREATING CONTAMINATED SOIL GASES AND LIQUIDS

[75] Inventors: Eliott N. Duffney, Rochester; Paul M. Tornatore, Pittsford; Scott M. Huber, Canandaigua; Ronald E. Hess, Webster, all of N.Y.

[73] Assignee: Xerox Corporation, Stamford, Conn.

[21] Appl. No.: 236,791

[22] Filed: Apr. 29, 1994

[51] Int. Cl.$^6$ .......................... B09B 3/00; A62D 3/00
[52] U.S. Cl. ..................... 405/128; 166/267; 166/370; 405/52; 588/249
[58] Field of Search ............... 405/128, 129, 52, 258; 166/267, 370, 67, 75.1; 210/747, 751

[56] References Cited

U.S. PATENT DOCUMENTS

| | | | |
|---|---|---|---|
| 5,011,329 | 4/1991 | Nelson et al. | 405/128 |
| 5,050,676 | 9/1991 | Hess et al. | 166/267 |
| 5,051,030 | 9/1991 | Saha et al. | 405/128 |
| 5,076,360 | 12/1991 | Morrow | 166/267 |
| 5,098,224 | 3/1992 | Netzel et al. | 405/128 |
| 5,172,764 | 12/1992 | Hajali et al. | 166/267 |
| 5,197,541 | 3/1993 | Hess et al. | 166/67 |
| 5,256,208 | 10/1993 | Rafson | 134/25.1 |
| 5,263,795 | 11/1993 | Corey et al. | 405/128 |
| 5,271,467 | 12/1993 | Lynch | 166/370 |
| 5,380,125 | 1/1995 | Croy | 166/267 |

*Primary Examiner*—Dennis L. Taylor
*Attorney, Agent, or Firm*—Judith L. Byorick

[57] ABSTRACT

Apparatus for extracting contaminants from a stream comprising a contaminant-containing mixture of liquids and gases which comprises: (a) a contaminant-containing mixture input; (b) a vapor-liquid separator receiving the contaminant-containing mixture from the input and producing a liquid component stream at a first outlet and a gaseous component at a second outlet; (c) an optional first contaminant removal system receiving the liquid component stream from the vapor-liquid separator and producing a contaminant-free liquid stream; (d) a vacuum inducing device in fluid communication with the contaminant-containing mixture input and the vapor-liquid separator and receiving said gaseous component from the vapor-liquid separator; (e) a cooling element receiving the gaseous component at a first temperature from the vacuum inducing device and producing the gaseous component at a second temperature from a first outlet and a condensed liquid component from a second outlet, said second temperature being lower than said first temperature; (f) a heating element receiving the gaseous component from the cooling element at said second temperature and producing a reduced-relative-humidity gas component at a third temperature, said third temperature being higher than said second temperature, said heating element having a heating jacket surrounding a conduit through which the gaseous component passes through the heating element, said heating jacket receiving a heating fluid from a first heat fluid conduit into a heating jacket input and outputting said heating fluid from a heating jacket outlet into a second heating fluid conduit; and (g) an optional second contaminant removal system receiving the reduced-relative-humidity gas component from the heating element and producing a contaminant-free gas; wherein the apparatus necessarily includes either the first contaminant removal system or the second contaminant removal system.

36 Claims, 4 Drawing Sheets

APPARATUS AND PROCESS FOR TREATING CONTAMINATED SOIL GASES AND LIQUIDS

BACKGROUND OF THE INVENTION

The present invention is directed to a method and apparatus for extracting contaminants from soil, soil liquids, and/or soil gases, wherein vapor and/or liquid recovered from the ground are pretreated prior to final removal of contaminants. More specifically, the present invention is directed to processes and apparatus for pretreating contaminant-containing gases and liquids extracted from soil, followed by final treatment to remove contaminants. One embodiment of the present invention is directed to an apparatus for extracting contaminants from a stream comprising a contaminant-containing mixture of liquids and gases which comprises: (a) a contaminant-containing mixture input; (b) a vapor-liquid separator receiving the contaminant-containing mixture from the input and producing a liquid component stream at a first outlet and a gaseous component at a second outlet; (c) an optional first contaminant removal system receiving the liquid component stream from the vapor-liquid separator and producing a contaminant-free liquid stream; (d) a vacuum inducing device in fluid communication with the contaminant-containing mixture input and the vapor-liquid separator and receiving said gaseous component from the vapor-liquid separator; (e) a cooling element receiving the gaseous component at a first temperature from the vacuum inducing device and producing the gaseous component at a second temperature from a first outlet and a condensed liquid component from a second outlet, said second temperature being lower than said first temperature; (f) a heating element receiving the gaseous component from the cooling element at said second temperature and producing a reduced-relative-humidity gas component at a third temperature, said third temperature being higher than said second temperature, said heating element having a heating jacket surrounding a conduit through which the gaseous component passes through the heating element, said heating jacket receiving a heating fluid from a first heat fluid conduit into a heating jacket input and outputting said heating fluid from a heating jacket outlet into a second heating fluid conduit; and (g) an optional second contaminant removal system receiving the reduced-relative-humidity gas component from the heating element and producing a contaminant-free gas; wherein the apparatus necessarily includes either the first contaminant removal system or the second contaminant removal system. Another embodiment of the present invention is directed to an apparatus for extracting contaminants from a stream comprising a contaminant-containing mixture of liquids and gases which comprises: (a) input means for inputting the contaminant-containing mixture; (b) vapor-liquid separating means for separating the contaminant-containing mixture into a liquid component stream and a gaseous component; (c) means for inducing a vacuum in fluid communication with the input means and the vapor-liquid separating means, said vacuum inducing means receiving the gaseous component from the vapor-liquid separating means; (d) optional means for removing contaminants from the liquid component of the mixture; (e) cooling means for reducing the temperature of the gaseous component subsequent to exiting the vacuum inducing means, thereby condensing liquid materials from the gaseous component and separating said liquid materials from the gaseous component; (f) means for heating the gaseous component subsequent to condensation of the liquid materials therefrom, said heating means supplying heat generated by said vacuum inducing means; and (g) optional means for removing contaminants from said gaseous component exiting said heating means; wherein the apparatus necessarily includes either the means for removing contaminants from said gaseous component exiting said heating means or the means for removing contaminants from the liquid component of the mixture. Yet another embodiment of the present invention is directed to a process for extracting contaminants from a stream comprising a contaminant-containing mixture of liquids and gases which comprises: (a) providing a contaminant-containing mixture of liquids and gases in fluid communication with a vacuum inducing device; (b) separating the contaminant-containing mixture into a liquid component stream and a gaseous component; (c) optionally removing contaminants from the liquid component stream; (d) transporting the gaseous component through the vacuum inducing device; (e) subsequent to transporting the gaseous component through the vacuum inducing device, cooling the gaseous component from a first temperature to a second temperature, thereby condensing liquid from the gaseous component; (f) subsequent to cooling the gaseous component to the second temperature, heating the gaseous component to a third temperature, said third temperature being higher than said second temperature, thereby reducing the relative humidity of the gaseous component, wherein heating of the gaseous component is accomplished with heat generated by the vacuum inducing device; and (g) optionally removing contaminants from the gaseous stream subsequent to heating of the gaseous component; wherein contaminants are necessarily removed from either the liquid component stream or the gaseous component.

Contaminants can exist in subsurface soil and groundwater in the liquid or vapor phase as discrete substances and mixed with and/or dissolved in groundwater and soil gases. Various contaminants can be found in groundwater and soil, such as volatile compounds, including volatile organic compounds, nonvolatile materials, metal contaminants, and the like. Such contaminants can be found and dealt with in the vadose (unsaturated) zone found between the surface of the earth and the water table, at the interface between the vadose zone and the water table, and in the saturated zone below the water table.

At many industrial and commercial facilities and at waste handling and disposal sites, soil and groundwater are contaminated with suspended or water-soluble chemicals, or both. A variety of techniques have been used for removal of contaminants and remediation of affected soil. One common technique entails the excavation and off-site treatment of the soil. Another technique entails saturating the contaminated soil with water in situ, causing the contaminants to be leached slowly from the soil by the water. The contaminated water can then be removed.

Techniques have also been proposed for removing volatile organic contaminants from soil by vacuum extraction. For example, in U.S. Pat. No. 4,323,122, it was proposed that a vacuum be applied in a borehole at the level of the water table, the assumption being that a contaminant such as gasoline, which is lighter than water, would float on the water table and present a layer that could be drawn off by vacuum applied to the liquid at or around that level. U.S. Pat. No. 4,323,122 (Knopik) discloses a system and method for recovering organic liquid such as gasoline which has settled on the water table in underground areas. The system comprises a conduit extending from the ground surface to a point just above the water table, a collection head fitted on the lower end of the conduit, a collection vessel connected to the upper end of the conduit, and an exhaust means for creating less than atmospheric pressure in the vessel. The collection head has a liquid impermeable end portion and a liquid permeable intermediate portion for permitting the passage of liquid. The process comprises providing an opening in the ground to a point beneath the surface of the water table, positioning the conduit with the collection head in place so that the liquid permeable wall of the collection head is just above the surface of the water table, connecting the conduit to the collection vessel intake, and exhausting air and other gaseous materials from the vessel to cause liquid to flow into the collection head through the conduit into the vessel.

Others have suggested the possibility of venting soil above the water table (i.e., in the vadose zone) to cause vaporization of the contaminant in the soil, and then drawing off the contaminant in the vapor phase. Groundwater requiring treatment is in such processes conventionally removed by pumping from separate conventional water wells. In situations in which water does flow into vacuum extraction wells, it has been suggested that a second, liquid phase pump be placed either in the well or at the surface to remove the water through a second conduit. For example, U.S. Pat. No. 4,660,639 (Visser et al.), the disclosure of which is totally incorporated herein by reference, discloses a process for the removal of volatile contaminants from the vadose zone of contaminated ground by extracting volatilized contaminants from the vadose zone by way of one or more vacuum extraction wells. The process entails drilling one or more wells into the subsurface media in the contaminated area, the well being constructed so that fluids in the vadose zone can flow into the well, whereas the liquid in the saturated zone below the water table cannot substantially flow into the well. The borehole and conduit of the well can optionally extend below the water table, in which case the vacuum applied to the upper portion of the conduit will be effective to draw contaminant from the vadose zone, but insufficient to draw a significant amount of water from the saturated zone into the conduit. If it is desired to remove groundwater from below the water table, this removal is accomplished either by a separate sampling device situated in the borehole or through a separate well.

In addition, Stinson, "EPA Site Demonstration of the Terra Vac In Situ Vacuum Extraction Process in Groveland, Massachusetts", Air & Waste Management Association, Vol. 39, No. 8, pages 1054 to 1062 (1989), the disclosure of which is totally incorporated herein by reference, discloses an evaluation of an in situ vacuum extraction process. The process entails removal of contaminants from the vadose zone by vacuum. Wells are installed in the contaminated vadose soil. A vacuum pump or blower induces air flow through the soil, stripping and volatilizing volatile organic compounds from the soil matrix into the air stream. Liquid water, if present in the soil, is also extracted along with the contamination. The two-phase stream of contaminated air and water flows to a vapor/liquid separator where contaminated water is removed. The contaminated air stream then flows through a treatment system such as gas-phase activated carbon to remove contaminants from the air stream. The clean air is exhausted to the atmosphere through a vent. U.S. Pat. No. 4,593,760 (Visser et al.), the disclosure of which is totally incorporated herein by reference, and U.S. Pat. No. Re. 33,102, the disclosure of which is totally incorporated herein by reference, also disclose processes for removal of volatile contaminants from the vadose zone of contaminated ground by pumping volatilized contaminants from the vadose zone using one or more vacuum extraction well.

"Forced Venting to Remove Gasoline Vapor from a Large-Scale Model Aquifer," American Petroleum Institute, Health and Environmental Sciences Department, API Publication No. 4431 (1984) discloses the results of experiments examining forced venting of air through the soil above a gasoline spill in a model aquifer. Various flow rates and geometries for the venting plumbing were used to determine the most efficient method of removing gasoline from the underground environment and lowering gasoline vapor concentrations in the unsaturated zone above the spill.

"Venting for the Removal of Hydrocarbon Vapors from Gasoline Contaminated Soil," J. Thornton and W. Wootan, *J. Environ. Sci. Health*, A17(1), 31-44 (1982) discloses the results of an experiment investigating the use of a venting strategy to remove gasoline vapors from contaminated soil strata. A contained gasoline leak was created in a large outdoor facility which simulates soil strata and a static water table. An air flow was established, and vapor samples taken before, during, and after venting were checked for hydrocarbon content.

U.S. Pat. No. 5,050,676 (Hess et al.) and U.S. Pat. No. 5,197,541 (Hess et al.), the disclosures of each of which are totally incorporated herein by reference, disclose apparatus and processes for two phase vacuum extraction of contaminants from the ground which entails vacuum withdrawal of liquid and gaseous phases as a common stream, separation of the liquid and gaseous phases, and subsequent treatment of the separated liquid and gases to produce clean effluents. Two phase vacuum extraction employs a single vacuum generating device to remove contaminants in both the liquid stream and soil gases through a single well casing.

U.S. Pat. No. 5,172,764 (Hajali et al.), the disclosure of which is totally incorporated herein by reference, discloses an apparatus and process for removing contaminants from a contaminated area of the ground having a vadose zone and a water table which comprises providing a borehole in the contaminated area; placing in the borehole a perforated riser pipe inside of which is situated a vacuum extraction pipe with an opening situated near, at, or at any point below the water table within the perforated riser pipe; while introducing a gas into the riser pipe, applying a vacuum to the vacuum extraction pipe to draw gases and liquid from the soil into the perforated riser pipe and from the riser pipe into the vacuum extraction pipe and transport both the gases and the liquid to the surface as a common stream; forming from the common stream a stream which is primarily liquid and a stream which is primarily gaseous; and separately treating the separated liquid and gas streams.

U.S. Pat. No. 5,076,360 (Morrow), the disclosure of which is totally incorporated herein by reference, discloses methods and apparatus for vacuum extraction of contaminants from the ground which, in a preferred embodiment, entails vacuum withdrawal of liquid and gaseous phases as a common stream, separation of the liquid and gaseous phases, and subsequent treatment of the separated liquid and gases to produce clean effluent. A primed vacuum extraction employs a single vacuum generating device to remove contaminants in both the liquid stream and soil gases through a single well casing utilizing a priming tube which introduces air or other gas to the liquid collected at the bottom of a well. The method permits vacuum extraction of both liquids and gases from the subsurface by way of wells having a liquid layer which is more than thirty feet below the soil surface or in which a screened interval of the extraction pipe is entirely below the liquid surface.

U.S. Pat. No. 5,271,467 (Lynch), the disclosure of which is totally incorporated herein by reference, discloses methods and systems for recovering groundwater, gases and vapors from subsurface locations in a single, integrated operation by applying a vacuum to groundwater recovery wells. Selective recovery of specific contaminants from zones of interest containing high levels of those contaminants is achieved by manipulating the local water table level. Groundwater recovery systems may also utilize eductor systems having venturi nozzles that create a vacuum networked. A plurality of such recovery wells operated using eductor systems may be operated by a single pump at or above grade level. In this fashion, a network of recovery wells may be operated using a single pump and control system. The recovery methods and systems are preferably utilized in association with known contaminant removal systems to provide complete removal of contaminants and improved remediation efficiencies.

Copending application U.S. Ser. No. 08/056,349 (Mancini et al.), filed Apr. 30,1993, entitled "Improved Process and Apparatus for High Vacuum Groundwater Extraction," the disclosure of which is totally incorporated herein by reference, discloses a process and apparatus in which vacuum extraction is used to remove soil contaminants in both the saturated and vadose zones. One embodiment of the invention is directed to a process for removing contaminants from a contaminated area of the ground having a vadose zone and a water table, which comprises providing a borehole in the contaminated area to a depth below the water table; placing in the borehole to a depth below the water table a perforated riser pipe inside of which is situated a vacuum extraction pipe with a bottom opening situated within the perforated riser pipe, said vacuum extraction pipe containing groundwater prior to application of a vacuum thereto, said vacuum extraction pipe having at least one gas inlet situated below the groundwater level in the vacuum extraction pipe; while introducing a gas into the riser pipe, applying a vacuum to the vacuum extraction pipe to draw gases and liquid from the soil into the perforated riser pipe and from the riser pipe into the vacuum extraction pipe and transport both the gases and the liquid to the surface as a two-phase common stream; introducing a gas into the vacuum extraction pipe at a level below the groundwater level in the vacuum extraction pipe to initiate two-phase flow within the vacuum extraction pipe; forming from the common stream a stream which is primarily liquid and a stream which is primarily gaseous; and separately treating the separated liquid and gas streams.

Processes are also known for treating soil gases and/or liquids containing contaminants. In processes wherein both gaseous and liquid phase contaminant-containing materials are brought to the surface, the gaseous and liquid phases generally are separated and treated separately. For example, in two-phase extraction processes, such as those disclosed in U.S. Pat. Nos. 5,050,676, 5,197,541, 5,172,764, and 5,076,360, subsequent to extraction, frequently the contamination resides predominantly in the vapor phase, which requires vapor phase treatment prior to discharge to the atmosphere. Treatment performance can be affected significantly by the conditions of the vapor stream treatment process. For example, in a typical process, the gases and liquids are drawn from the ground with a high vacuum capacity pump, typically one with a vacuum capacity of over 20 inches of mercury, such as a liquid ring pump employing water as the seal liquid, and subsequent to separation of the liquid and vapor phases, the vapor phase is treated with carbon filters. Treatment efficiencies, however, frequently are poor. The vapor phase, which under vacuum exits the ground at a temperature of about 55° F. and a relative humidity of about 100%, passes through the vacuum pump, where its pressure and volume are changed. The pressure and volume changes result in a change in saturation temperature (the temperature where the relative humidity is 100%) to a temperature typically above 100° F. The vapor phase may be further heated to decrease its relative humidity to a value more favorable for carbon filter treatment, such as about 40 percent, to maximize carbon absorption efficiency. To achieve this relative humidity, however, the vapor stream typically is heated to temperatures of about 140° F., which is significantly higher than the temperatures at which carbon absorption efficiency is maximized, typically about 70° F. To overcome this difficulty, it has been proposed to situate the carbon filters in the treatment system such that the vapor phase stream passes through the carbon filters prior to passing through the vacuum pump, thereby taking advantage of the relatively low temperature of the vapor stream at this point in time. This approach, however, also results in reduced carbon absorption efficiency, since at this stage in the process the vapor stream is still under high vacuum conditions, and volatile organic compound contaminants tend to be stripped out of carbon filters under high vacuum conditions.

Accordingly, although known apparatus and processes are suitable for their intended purposes, a need remains for processes and apparatus for extracting liquid contaminants, gaseous contaminants, or both from soil (including both particulate soil and bedrock). In addition, a need remains for processes and apparatus for pretreating contaminated liquids and gases obtained from soil with increased efficiency. Further, there is a need for processes and apparatus for pretreating gaseous materials containing contaminants extracted from soil (including both particulate soil and bedrock), soil liquids, and/or soil gases. Additionally, there is a need for processes and apparatus that enable control of the relative humidity and temperature conditions of gaseous materials containing contaminants extracted from soil (including both particulate soil and bedrock), soil liquids, and/or soil gases prior to final treatment to remove the contaminants. There is also a need for a system for treating soil, soil liquids, and/or soil gases containing contaminants wherein the processes and apparatus employed exhibit process flexibility, thereby rendering the apparatus and processes amenable to alternative treatment processes at optimum conditions. In addition, there is a need for processes and apparatus for pretreating gaseous materials containing contaminants extracted from soil, soil liquids, and/or soil gases which enable the use of carbon filters at enhanced efficiencies. Further, a need remains for processes and apparatus for recovering free phase contaminants from liquid and gaseous sources and reduce final treatment requirements. For example, recovery of free phase contaminants from liquid and gaseous sources can provide a recyclable process stream and reduce the quantity of contaminants requiring final treatment. In addition, there is a need for processes and apparatus for pretreating contaminated liquids and/or gases that exhibit process flexibility which enhances the performance of all existing vacuum based remediation technologies. There is also a need for processes and apparatus for pretreating contaminated liquids and gases obtained from soil with reduced energy requirements. Additionally, a need remains for processes and apparatus for pretreating contaminated liquids and gases obtained from soil which enable relative humidity conditioning of the gaseous phase at reduced cost. There is also a need for processes and apparatus for pretreating contaminated liquids and gases obtained from soil which employ relatively compact, reduced-space equipment. It is particularly desirable for the entire vacuum extraction system and vapor phase conditioning system to be combined onto a single skid unit that enables portability of the system without losing effectiveness, and which also enables reduced investment cost.

SUMMARY OF THE INVENTION

It is an object of the present invention to provide a process and apparatus for removing contaminants from groundwater, soil, or both with the above noted advantages.

It is another object of the present invention to provide processes and apparatus for extracting liquid contaminants, gaseous contaminants, or both from soil.

It is yet another object of the present invention to provide processes and apparatus for pretreating contaminated liquids and gases obtained from soil with increased efficiency.

It is still another object of the present invention to provide processes and apparatus for pretreating gaseous materials containing contaminants extracted from soil, soil liquids, and/or soil gases.

Another object of the present invention is to provide processes and apparatus that enable control of the relative humidity and temperature conditions of gaseous materials containing contaminants extracted from soil, soil liquids, and/or soil gases prior to final treatment to remove the contaminants.

Yet another object of the present invention is to provide a processes and apparatus for pretreating soil, soil liquids, and/or soil gases containing contaminants wherein the processes and apparatus employed exhibit process flexibility, thereby rendering the apparatus and processes amenable to alternative treatment processes at optimum conditions.

Still another object of the present invention is to provide processes and apparatus for pretreating gaseous materials containing contaminants extracted from soil, soil liquids, and/or soil gases which enable the use of carbon filters at enhanced efficiencies.

It is another object of the present invention to provide processes and apparatus for recovering free phase contaminants from liquid and gaseous sources and reduce final treatment requirements.

It is yet another object of the present invention to provide processes and apparatus for pretreating contaminated liquids and/or gases that exhibit process flexibility which enhances the performance of all existing vacuum based remediation technologies.

It is still another object of the present invention to provide processes and apparatus for pretreating contaminated liquids and gases obtained from soil with reduced energy requirements.

Another object of the present invention is to provide processes and apparatus for pretreating contaminated liquids and gases obtained from soil which enable relative humidity conditioning of the gaseous phase at reduced cost.

Yet another object of the present invention is to provide processes and apparatus for pretreating contaminated liquids and gases obtained from soil which employ relatively compact, reduced-space equipment.

These and other objects of the present invention (or specific embodiments thereof) can be achieved by providing an apparatus for extracting contaminants from a stream comprising a contaminant-containing mixture of liquids and gases which comprises: (a) a contaminant-containing mixture input; (b) a vapor-liquid separator receiving the contaminant-containing mixture from the input and producing a liquid component stream at a first outlet and a gaseous component at a second outlet; (c) an optional first contaminant removal system receiving the liquid component stream from the vapor-liquid separator and producing a contaminant-free liquid stream; (d) a vacuum inducing device in fluid communication with the contaminant-containing mixture input and the vapor-liquid separator and receiving said gaseous component from the vapor-liquid separator; (e) a cooling element receiving the gaseous component at a first temperature from the vacuum inducing device and producing the gaseous component at a second temperature from a first outlet and a condensed liquid component from a second outlet, said second temperature being lower than said first temperature; (f) a heating element receiving the gaseous component from the cooling element at said second temperature and producing a reduced-relative-humidity gas component at a third temperature, said third temperature being higher than said second temperature, said heating element having a heating jacket surrounding a conduit through which the gaseous component passes through the heating element, said heating jacket receiving a heating fluid from a first heat fluid conduit into a heating jacket input and outputting said heating fluid from a heating jacket outlet into a second heating fluid conduit; and (g) an optional second contaminant removal system receiving the reduced-relative-humidity gas component from the heating element and producing a contaminant-free gas; wherein the apparatus necessarily includes either the first contaminant removal system or the second contaminant removal system. Another embodiment of the present invention is directed to an apparatus for extracting contaminants from a stream comprising a contaminant-containing mixture of liquids and gases which comprises: (a) input means for inputting the contaminant-containing mixture; (b) vapor-liquid separating means for separating the contaminant-containing mixture into a liquid component stream and a gaseous component;

(c) means for inducing a vacuum in fluid communication with the input means and the vapor-liquid separating means, said vacuum inducing means receiving the gaseous component from the vapor-liquid separating means; (d) optional means for removing contaminants from the liquid component of the mixture; (e) cooling means for reducing the temperature of the gaseous component subsequent to exiting the vacuum inducing means, thereby condensing liquid materials from the gaseous component and separating said liquid materials from the gaseous component; (f) means for heating the gaseous component subsequent to condensation of the liquid materials therefrom, said heating means supplying heat generated by said vacuum inducing means; and (g) optional means for removing contaminants from said gaseous component exiting said heating means; wherein the apparatus necessarily includes either the means for removing contaminants from said gaseous component exiting said heating means or the means for removing contaminants from the liquid component of the mixture. Yet another embodiment of the present invention is directed to a process for extracting contaminants from a stream comprising a contaminant-containing mixture of liquids and gases which comprises: (a) providing a contaminant-containing mixture of liquids and gases in fluid communication with a vacuum inducing device; (b) separating the contaminant-containing mixture into a liquid component stream and a gaseous component; (c) optionally removing contaminants from the liquid component stream; (d) transporting the gaseous component through the vacuum inducing device; (e) subsequent to transporting the gaseous component through the vacuum inducing device, cooling the gaseous component from a first temperature to a second temperature, thereby condensing liquid from the gaseous component; (f) subsequent to cooling the gaseous component to the second temperature, heating the gaseous component to a third temperature, said third temperature being higher than said second temperature, thereby reducing the relative humidity of the gaseous component, wherein heating of the gaseous component is accomplished with heat generated by the vacuum inducing device; and (g) optionally removing contaminants from the gaseous stream subsequent to heating of the gaseous component; wherein contaminants are necessarily removed from either the liquid component stream or the gaseous component.

BRIEF DESCRIPTION OF THE DRAWINGS

Illustrated in FIG. 1 is a schematic view of an apparatus and process for handling and treating gaseous and liquid materials removed from the ground by the present invention.

Illustrated in FIG. 2 is a schematic view of another apparatus and process for handling and treating gaseous and liquid materials removed from the ground by the present invention, wherein a liquid ring pump is employed to generate vacuum.

Figure 3:
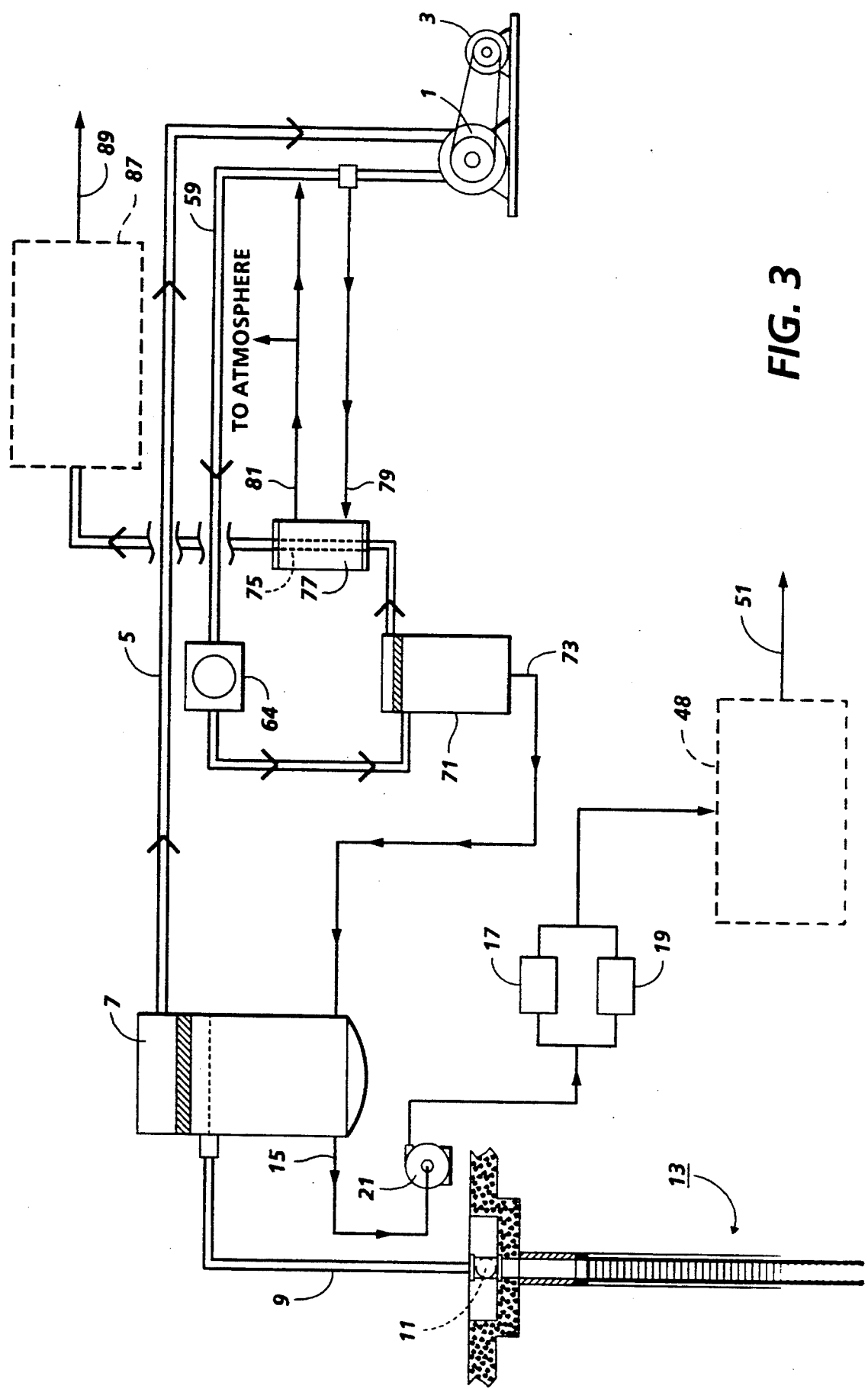

Illustrated in FIG. 3 is a schematic view of yet another apparatus and process for handling and treating gaseous and liquid materials removed from the ground by the present invention, wherein a vacuum inducing device which does not employ a seal liquid is employed to generate vacuum.

Figure 4:
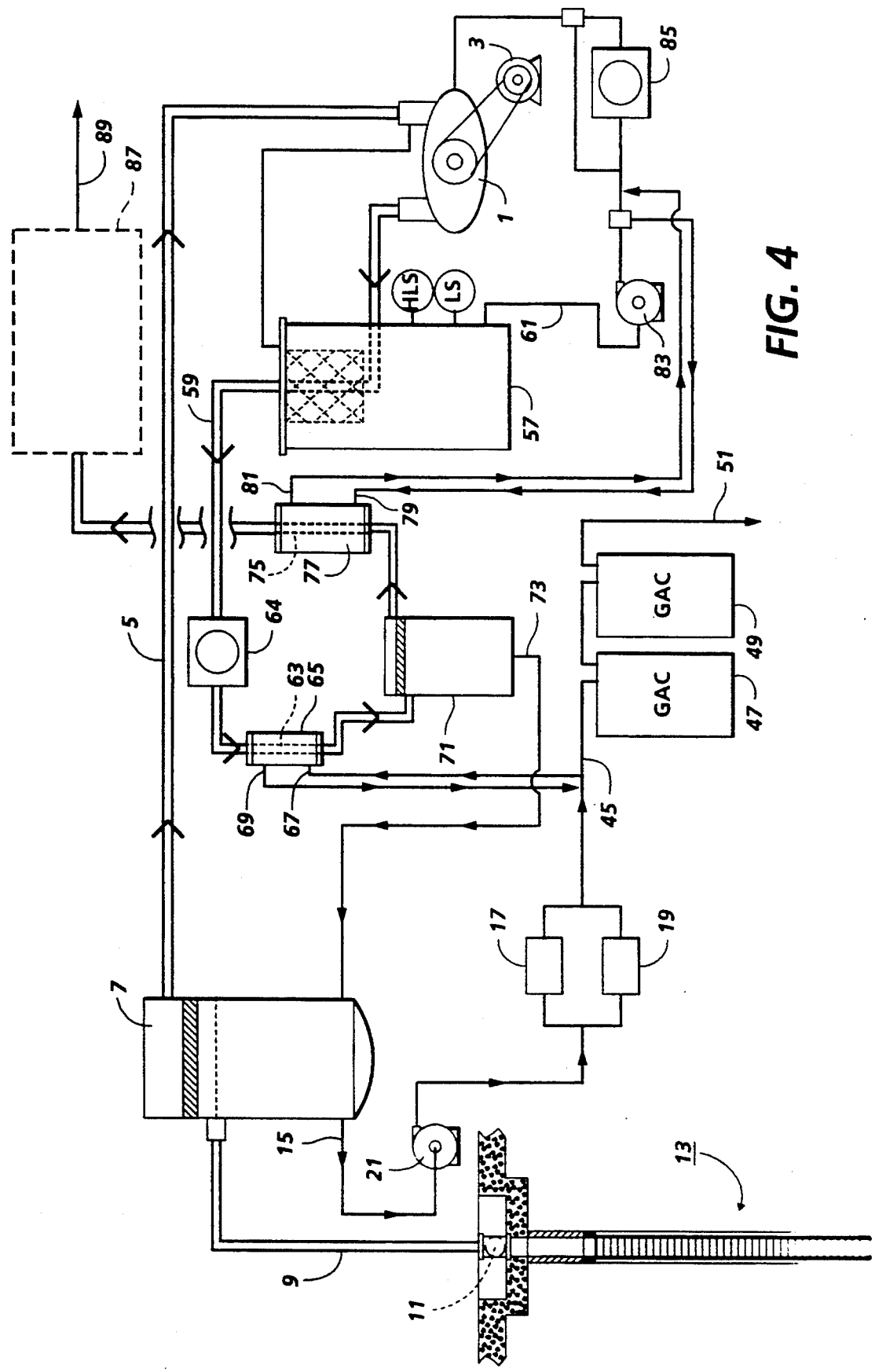

Illustrated in FIG. 4 is a schematic view of still another apparatus and process for handling and treating gaseous and liquid materials removed from the ground by the present invention, wherein a liquid ring pump is employed to generate vacuum, liquid recovered from the ground is used for cooling gases recovered from the ground, and the recovered liquid is subjected to carbon treatment.

DETAILED DESCRIPTION OF THE INVENTION

In processes of the present invention, contaminants and/or contaminant-containing gases and liquids are extracted from the ground. The mixture of gas and liquid phases is first treated to separate the gases from the liquids. The liquid phase thereafter is treated separately to remove contaminants therefrom. The gaseous phase passes through a vacuum inducing device which provides the energy for extraction of the gas and liquid phases from the ground. The vacuum inducing device can be any suitable apparatus, such as a centrifugal blower, a vane type blower, a rotary blower, a liquid ring vacuum pump, or the like. In a preferred embodiment, the pump is a liquid ring vacuum pump which employs as a seal liquid a low vapor pressure liquid, which seals the vacuum and acts as a recirculating coolant to remove heat generated by the mechanical action of the pump. When a liquid ring pump is employed, subsequent to exiting the vacuum pump, the gaseous phase passes through an air-seal liquid separator to separate the gaseous phase and the seal liquid from the pump. The gas stream is then cooled. In one preferred embodiment, cooling occurs by passing the gas stream through a condenser which is cooled by a jacket of water from the liquid phase treatment process. The gas stream can, however, also be cooled by any other suitable cooling system. As a result of the cooling, volatile organic compounds and, possibly, water are condensed from the gas stream. Thereafter, the gas stream is heated to a desirable temperature for subsequent treatment of the gas stream to remove remaining contaminants, such as carbon adsorption, thermal oxidation, catalytic oxidation, biotreatment, resin adsorption, or the like. The gas stream is heated using part of the heat generated by the vacuum inducing device. Typically, a heated fluid, either a liquid or a gas, is conveyed between the vacuum inducing device and the heater to effect this end. When a liquid ring pump is employed, heat can be supplied by at least some of the seal liquid from the liquid ring pump; subsequent to exiting the pump and prior to completion of the cooling of the seal liquid, at least some of the seal liquid is redirected from the main recirculation path to jacket the heater, and subsequently re-enters the seal liquid recirculation path and is cooled for re-entry of the pump. When a conventional pump is employed, heat can be supplied by directing at least some of the exhaust gases from the pump's discharge, prior to the air cooling system, which generally includes a fan, to the heater via any suitable conduit, such as a pipe or the like. Thereafter, the gas stream is recombined with the balance of the discharge stream, cooled and reheated, passed through subsequent treatment to remove residual contaminants, and then released to the atmosphere.

FIGS. 1, 2, 3, and 4 (not drawn to scale) illustrate schematically the steps and apparatus for treating soil liquids and gases containing contaminants. A vacuum inducing device 1, driven by electric motor 3, is in fluid communication through a pipe 5, vapor-liquid phase separator such as a knock-out pot 7, and pipe 9 with the pipe fitting 11 to one or more extraction wells 13. The knock-out pot 7 can be of conventional design, familiar to those skilled in the art, such as those fabricated or supplied by Burgess Manning, Anderson Separator, or the like. The vacuum inducing device 1 can be of any conventional design, such as a centrifugal blower, a vane type blower, a rotary blower, a liquid ring vacuum pump, or the like.

The knock-out pot 7 serves to separate mechanically the two phases emerging from the extraction well 13, enabling them to be subjected to appropriate further processing. In this regard, a pipe 15 is provided in association with the knock-out pot 7, to conduct effluent in the liquid phase to a pump 21 and then through optional filtration and, if desired, final treatment. Optional filtration is provided in the embodiment illustrated in FIGS. 2, 3, and 4 by parallel filters 17 and 19 which can alternately or simultaneously be used in a conventional manner. Cut-off valves, omitted in the drawings for clarity, permit either filter 17 or 19 to be isolated and each filter to be removed, cleaned, or replaced. Suitable pressure gauges (not shown) can be placed on the inlet and discharge sides of the filters 17 and 19 to indicate filter loading. Examples of suitable filters 17 and 19 include cartridge or bag type filters as supplied by Cuno, Incorporated, Rosedale Products, Incorporated, 3M Filtration Products, Ronningen-Petter Filters, or the like. Other separation techniques and apparatus can also be used.

A transfer pump 21 serves to deliver the liquid phase effluent of the knock-out pot 7 to treatment. Examples of suitable transfer pumps include progressive cavity pumps or centrifugal pumps, as supplied by Robbins Meyers, Incorporated, Price Pump Company, Crane-Deming Pumps, Goulds Pumps Company, or the like. Other similar apparatus can also be used.

If desired (not shown), the liquid phase can be fed to an optional air stripper assembly to remove from the effluent volatile organic compounds. An example of an air stripper assembly employed for treatment of the liquid phase is illustrated in, for example, U.S. Pat. Nos. 5,050,676, 5,197,541, and 5,172,764, the disclosures of each of which are totally incorporated herein by reference. The optional air stripper assembly if desired, be omitted, particularly when two-phase vacuum extraction processes, such as those disclosed in, for example, U.S. Pat. Nos. 5,050,676, 5,197,541, 5,172,764, 5,076,360, and copending application U.S. Ser. No. 08/056,349, the disclosures of each of which are totally incorporated herein by reference, are employed to draw contaminated groundwater and contaminated soil gases from the ground as a common stream. It is hypothesized that the intimate mixing of the air and water during two-phase vacuum extraction (at which time groundwater is extracted in an air stream under vacuum) allows the volatile compounds to come out of solution, thus obviating the need for later air stripping. Avoidance of the need for an air stripper assembly also reduces the total volume of air streams bearing volatile organic compounds. In situations in which air emissions must be controlled, this is a distinct advantage. Another advantage of the two-phase vapor extraction process, as practiced without additional air stripping, is that due to the low pressure at which the vapor/liquid mixing and separation are accomplished, there is no less oxygenation of the water than would result from conventional air stripping. It is to be expected that lower dissolved oxygen levels will result in less corrosion and fouling of downstream components of the apparatus.

Figure 1:
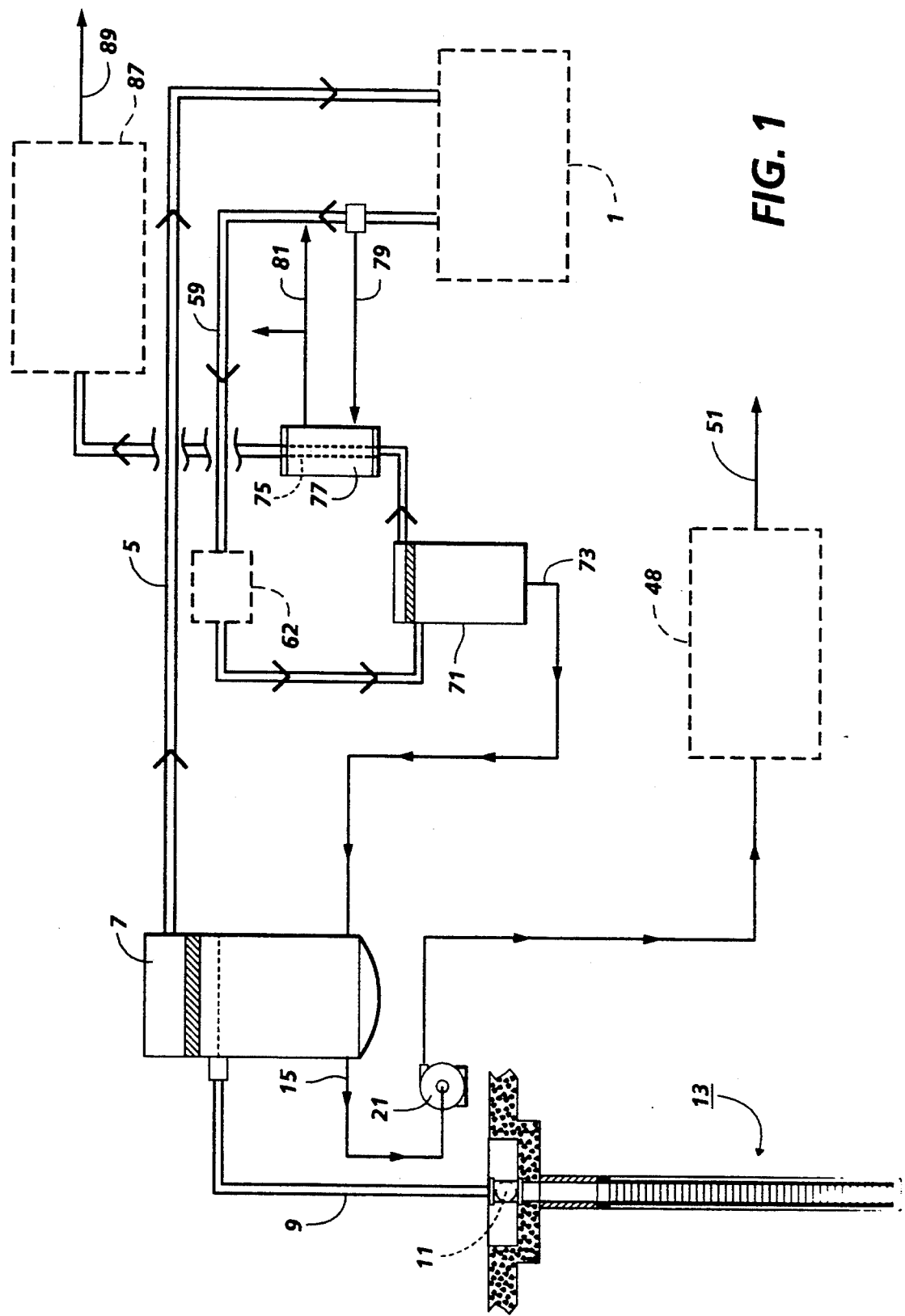
Figure 2:
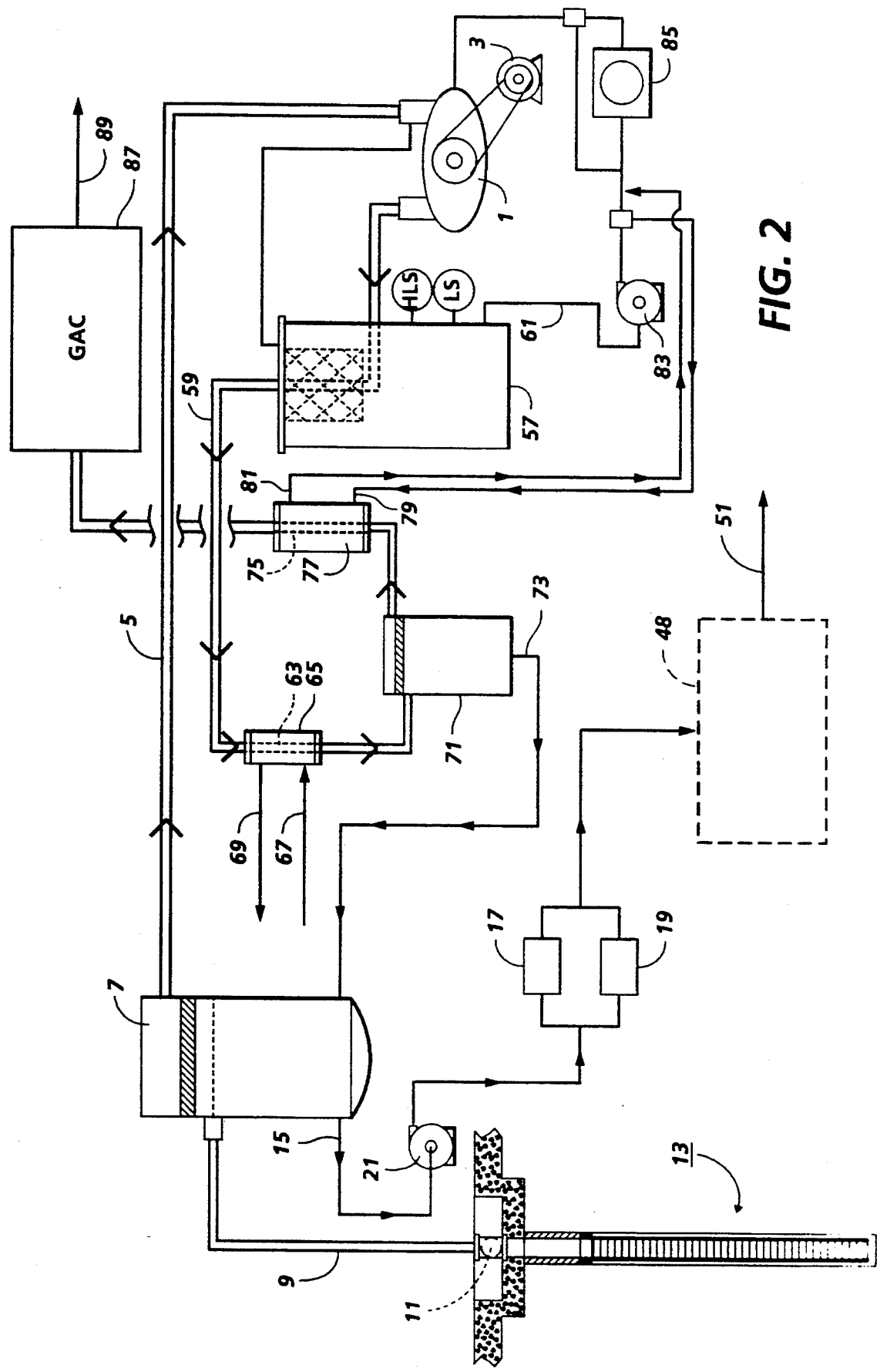

From optional filters 17 and 19, the liquid stream is routed for further processing, generally designated 48 in FIGS. 1, 2, and 3. Examples of suitable processing to remove contaminants, if present in the liquid phase, include carbon adsorption, advanced oxidation, biological treatment, resin adsorption, or the like. In the embodiment illustrated in FIG. 4, the liquid is passed in two stages through canisters 47 and 49 containing granular activated carbon, such as that available from Carbtrol Corporation, Envirotrol, or the like. Other contaminant removal steps or techniques can also be used. Final liquid phase effluent is delivered through pipe 51 to an appropriate discharge point.

As indicated above, under the influence of the vacuum inducing device 1 vapors separated from the two-phase effluent from the extraction well 13 are drawn to vacuum inducing device 1. In the embodiment of the invention illustrated in FIGS. 2 and 4, the vacuum inducing device 1 is a liquid ring vacuum pump. Examples of suitable commercially available liquid ring vacuum pumps include those available from Intervac Corporation, Sihi Pumps, Nash Engineering, or the like. The liquid ring pump employs a seal liquid which acts as a sealant of the vacuum and which also acts as a recirculating coolant for the pump. For the present invention, while water is a suitable seal liquid, a relatively low vapor pressure liquid is the preferred seal liquid. Examples of preferred seal liquids include mineral oils, turbine oils, and the like. One preferred seal liquid is SAE 10 oil, such as those products available from Mobil Oil, Quaker State, or the like. Another example of a preferred seal liquid is the hydrotreated, highly refined, dewaxed paraffinic oil CP-9001-22 available from Intervac Corporation, Victor, N.Y. The seal liquid preferably exhibits little or no volatility at the maximum operating temperature of the pump. Preferably, the seal liquid has a vapor pressure of less than about 25 mm Hg at the maximum operating temperature of the pump. The specific seal liquid selected may depend on considerations such as compatibility of the seal liquid with the specific organic contaminants expected to be recovered from the ground (preferably, the specific contaminants present are not highly soluble in the seal liquid), the temperature range at which the pump will be operated (preferably, the seal liquid does not volatilize or decompose at the pump operating temperatures, which typically are from about 50° to about 400° F., more typically from about 140° to about 250° F., and preferably from about 160° to about 185° F.), the viscosity of the seal liquid at both the projected operating temperature and the start-up temperature, and the like.

When a liquid ring vacuum pump is employed, as illustrated in FIGS. 2 and 4, the pump exhausts to an air-seal liquid separator 57, the vapor effluent of which is conducted to further processing through a pipe 59. The bulk of the seal liquid effluent from the air-seal liquid separator 57 is drawn off through a line 61 to join the flow in the seal liquid line servicing the liquid ring pump. The air-seal liquid separator 57 can be of any suitable or conventional design for coalescing of seal liquid mist and the gas stream. Examples of suitable coalescing mist elements include those available from Technolab, Osmonics, MechanEquip, or the like. The seal liquid exits the air-seal liquid separator 57 through pipe 61 to the seal liquid circulation pump 83. The circulation pump 83 can be of any suitable or conventional design, such as centrifugal pumps available from Price Pump Company, Goulds Pumps Company, Burks Pumps, or the like. Heat is transferred from a portion of the seal liquid stream to the vapor stream by heater 77. The seal liquid stream is then cooled, if necessary, to an appropriate operating temperature and returned to the liquid ring vacuum pump.

Subsequent to passing through the pump (and the air-seal liquid separator in FIGS. 2 and 4), the vapor stream is conducted through pipe 59 to a cooling system, generally designated 62 in FIG. 1. Any desired method may be employed for cooling the gaseous stream. For example, as illustrated in FIG. 4, the vapor stream first passes through after-cooler 64, which in the illustrated embodiment is an air-to-air heat exchanger. As shown in FIG. 4, the vapor stream passes from after-cooler 64 through condenser 63, an air-to-liquid heat exchanger which, in the illustrated embodiment is cooled by a jacket 65 of water from the liquid phase treatment process which enters jacket 65 through line 67 and exits jacket 65 through line 69. Examples of suitable air-to-air and air-to-liquid heat exchangers include those supplied by Airtek, Thermal Transfer Products, Ltd., Liebert Corporation, Bell and Gossett, or the like. While not required, in the embodiment illustrated in FIG. 4, it is preferred that the water enter jacket 65 subsequent to passing through filters 17 and 19 to minimize deposits of contaminants in jacket 65. If desired, however, the coolant in condenser jacket 65 can also be supplied from another source, such as an outside water supply, a recirculating coolant system, or the like. In another embodiment, as shown in FIG. 3, the vapor stream passes from pipe 59 to air-to-air heat exchanger 64, where the vapor stream is cooled and then conveyed to condensate separator 71. In yet another embodiment, as shown in FIG. 2, the vapor stream passes directly from pipe 59 exiting airseal liquid separator 57 into condenser 63, which, in the illustrated embodiment, is cooled by a jacket 65 of water from a water supply which enters jacket 65 through line 67 and exits jacket 65 through line 69. Cooling system 62 may include any other suitable cooling methods, and is not limited to air-to-air heat exchangers or air-to-liquid heat exchangers.

The vapor and condensed liquid from cooling system 62 then enter condensate separator 71, where condensed liquid exits condensate separator 71 through pipe 73 and is conducted to the water treatment system at knock-out pot 7. Examples of suitable condensate separators include those available from Burgess Manning, Incorporated, Anderson Separator, or the like. Optionally, if desired, (not shown) condensate separator 71 can be equipped with multiple outlets to facilitate separation of water and liquid contaminants which have either a higher or lower specific gravity than water. An outlet situated at the bottom of condensate separator 71 enables draining of liquid contaminants with a specific gravity higher than that of water, and an outlet situated at or near the liquid level within condensate separator 71 enables draining of liquid contaminants with a specific gravity lower than that of water, in each instance permitting removal of the liquid contaminant from the condensate separator 71 prior to draining of the water.

Typically, as illustrated in FIGS. 1 through 4, the vapor stream passing through the cooling system (62 in FIG. 1, 63 and 64 in FIG. 4, 63 in FIG. 2, 64 in FIG. 3) is cooled from initial temperatures of from about 100° to about 400° F. to temperatures of from about 40° to about 100° F., more typically from about 60° to about 80° F. when water from the liquid stream is employed as the coolant as illustrated in FIG. 4, and to temperatures of from about 40° to about 60° F. when other cooling methods are employed, although the temperature can be varied as desired.

The vapor stream exiting condensate separator 71 is then heated in heater 75. Heater 75 employs the mechanical and compression heat generated by the vacuum inducing device 1, either as direct heating using discharge gases (for non-liquid sealed pumps) or heat recovery from circulating seal liquid (for liquid ring pumps), conveyed from vacuum inducing device 1 to heater 75 through a conduit 79 and either returned to pump discharge piping or otherwise disposed of through a conduit 81. For example, as illustrated in FIGS. 2 and 4, heater 75 provides heat via a jacket 77 of seal liquid from the liquid ring pump recirculating seal liquid system. Seal liquid enters jacket 77 through line 79, which conveys the seal liquid from the main seal liquid circulation system of the pump, and exits jacket 77 through line 81, which conveys the seal liquid back to the pump's main seal liquid circulation system. Seal liquid in the recirculation stream is circulated by seal liquid circulation pump 83 and, if necessary, prior to reentering pump 1, passes through air-seal liquid heat exchanger 85, where the seal liquid is cooled. Air-seal liquid heat exchanger 85 can be any suitable or desired arrangement for cooling the seal liquid, such as an air-to-air heat exchanger, an air-to-liquid heat exchanger, or any other cooling apparatus. As illustrated in FIG. 3, when a non-liquid-seal pump, such as a rotary blower, is employed, heat is supplied to heater 75 by directing at least some of the exhaust vapors from the pump through conduit 79. The heated gases exit jacket 77 through line 81, and can either be directed back to the pump discharge piping or vented to the atmosphere. Examples of suitable apparatus for heater 77 include heat transfer devices available from, for example, Thermal Transfer Products, Liebert Corporation, Bell and Gossett, or the like. Other heat transfer techniques and apparatus can also be used.

The vapor stream is heated to the desired temperature for further processing at heater 75; typically, this temperature is within the optimum range of temperatures for obtaining maximum efficiency with final vapor treatment processes. For example, when the vapor stream is subsequently treated with carbon filters, heater 75 typically heats the vapor stream to a temperature of from about 40° to about 140° F., more typically from about 50° to about 110° F., and preferably from about 60° to about 70° F., although the temperature can be outside these ranges. Relative humidity of the vapor phase at its initial temperature (prior to cooling) typically is from about 50 to about 100 percent, whereas the relative humidity of the vapor phase at the temperature subsequent to heating typically is from about 5 to about 40 percent. The vapor stream then enters the subsequent treatment system 87, where additional vapor phase contaminants are removed, and is vented to the atmosphere at exit 89. The treatment system 87 can be any desired method for removing contaminants from the gaseous stream, such as, for example, a carbon filtration system or other carbon adsorption device, a thermal oxidation system, a catalytic oxidation system, a biological treatment system, a resin adsorption system, or any other final treatment system appropriate for the contaminants of concern. As illustrated in FIG. 4, the treatment method is by carbon adsorption using granular activated carbon, such as that available from Carbtrol Corporation, Envirotrol, or the like.

Other embodiments and modifications of the present invention may occur to those skilled in the art subsequent to a review of the information presented herein; these embodiments and modifications, as well as equivalents thereof, are also included within the scope of this invention.

What is claimed is:

1. Apparatus for extracting contaminants from a stream comprising a contaminant-containing mixture of liquids and gases which comprises:
   (a) a contaminant-containing mixture input;
   (b) a vapor-liquid separator receiving the contaminant-containing mixture from the input and producing a liquid component stream at a first outlet and a gaseous component at a second outlet;
   (c) an optional first contaminant removal system receiving the liquid component stream from the vapor-liquid separator and producing a contaminant-free liquid stream;
   (d) a vacuum inducing device in fluid communication with the contaminant-containing mixture input and the vapor-liquid separator and receiving said gaseous component from the vapor-liquid separator;
   (e) a cooling element receiving the gaseous component at a first temperature from the vacuum inducing device and producing the gaseous component at a second temperature from a first outlet and a condensed liquid component from a second outlet, said second temperature being lower than said first temperature;
   (f) a heating element receiving the gaseous component from the cooling element at said second temperature and producing a reduced-relative-humidity gas component at a third temperature, said third temperature being higher than said second temperature, said heating element having a heating jacket surrounding a conduit through which the gaseous component passes through the heating element, said heating jacket receiving a heating fluid from a first heat fluid conduit into a heating jacket input and outputting said heating fluid from a heating jacket outlet into a second heating fluid conduit; and
   (g) an optional second contaminant removal system receiving the reduced-relative-humidity gas component from the heating element and producing a contaminant-free gas;
wherein the apparatus necessarily includes either the first contaminant removal system or the second contaminant removal system.

2. An apparatus according to claim 1 wherein the apparatus removes contaminants from a contaminated area of the ground having a water table and a vadose zone above the water table, wherein the contaminant-containing mixture input comprises a perforated riser pipe extending downwardly from the surface of the ground to a level below the water table, wherein at least some of the perforations of the riser pipe are disposed below the water table, wherein the vacuum inducing device forms a zone of reduced pressure around said perforated riser pipe, draws soil gases and liquids into the perforated riser pipe, and conveys said soil gases and liquids to the surface as a common stream.

3. An apparatus according to claim 2 wherein the perforations in the riser pipe are situated only below the water table.

4. An apparatus according to claim 2 wherein the perforations in the riser pipe are situated both in the vadose zone and below the water table.

5. An apparatus according to claim 2 wherein the perforations in the riser pipe are situated only in the vadose zone above the water table.

6. An apparatus according to claim 1 wherein the contaminants comprise volatile organic compounds.

7. An apparatus according to claim 1 wherein the second contaminant removal device comprises at least one carbon filter.

8. An apparatus according to claim 1 wherein the cooling element has a cooling jacket surrounding a conduit through which the gaseous component passes through the cooling element, said cooling jacket receiving liquid from the liquid component stream produced from the first outlet of the vapor-liquid separator and reintroducing said liquid from a cooling jacket outlet into the liquid component stream.

9. An apparatus according to claim 1 wherein said first temperature is from about 100° to about 400° F. and said second temperature is from about 40° to about 100° F.

10. An apparatus according to claim 1 wherein said second temperature is from about 40° to about 100° F. and said third temperature is from about 60° to about 140° F.

11. An apparatus according to claim 1 wherein the relative humidity of the gaseous component at the first temperature is from about 50 to about 100 percent and the relative humidity of the reduced-relativehumidity gas component at the third temperature is from about 5 to about 40 percent.

12. An apparatus according to claim 1 wherein the vacuum inducing device is a liquid ring pump having a seal liquid exhibiting little or no volatility at the maximum operating temperature of the pump and wherein the apparatus also comprises:
   (1) a seal liquid heat exchanger receiving seal liquid from said liquid ring pump through a first seal liquid conduit at a fourth temperature and reintroducing said seal liquid into the liquid ring pump through a second seal liquid conduit at a fifth temperature, said fifth temperature being lower than said fourth temperature; and
   (2) an air-seal liquid separator receiving the gaseous component from the liquid ring pump and producing seal liquid at a first outlet and the gaseous component at a second outlet;
wherein the cooling element receives the gaseous component from the airseal liquid separator and the heating jacket of the heating element receives seal liquid from said first seal liquid conduit into the heating jacket input and reintroduces seal liquid from the heating jacket outlet into said first seal liquid conduit.

13. Apparatus for extracting contaminants from a stream comprising a contaminant-containing mixture of liquids and gases which comprises:
   (a) input means for inputting the contaminant-containing mixture;
   (b) vapor-liquid separating means for separating the contaminant-containing mixture into a liquid component stream and a gaseous component;
   (c) means for inducing a vacuum in fluid communication with the input means and the vapor-liquid separating means, said vacuum inducing means receiving the gaseous component from the vapor-liquid separating means;

(d) optional means for removing contaminants from the liquid component of the mixture;

(e) cooling means for reducing the temperature of the gaseous component subsequent to exiting the vacuum inducing means, thereby condensing liquid materials from the gaseous component and separating said liquid materials from the gaseous component;

(f) means for heating the gaseous component subsequent to condensation of the liquid materials therefrom, said heating means supplying heat generated by said vacuum inducing means; and (g) optional means for removing contaminants from said gaseous component exiting said heating means; wherein the apparatus necessarily includes either the means for removing contaminants from said gaseous component exiting said heating means or the means for removing contaminants from the liquid component of the mixture.

14. An apparatus according to claim 13 wherein the apparatus removes contaminants from a contaminated area of the ground having a water table and a vadose zone above the water table, wherein the input means for inputting the contaminant-containing mixture comprises a perforated riser pipe extending downwardly from the surface of the ground to a level below the water table, wherein at least some of the perforations of the riser pipe are disposed below the water table, wherein the vacuum inducing means forms a zone of reduced pressure around said perforated riser pipe, draws soil gases and liquids into the perforated riser pipe, and conveys said soil gases and liquids to the surface as a common stream.

15. An apparatus according to claim 14 wherein the perforations in the riser pipe are situated only below the water table.

16. An apparatus according to claim 14 wherein the perforations in the riser pipe are situated both in the vadose zone and below the water table.

17. An apparatus according to claim 14 wherein the perforations in the riser pipe are situated only in the vadose zone above the water table.

18. An apparatus according to claim 13 wherein the contaminants comprise volatile organic compounds.

19. An apparatus according to claim 13 wherein the means for removing contaminants from said gaseous component exiting said heating means comprises at least one carbon filter.

20. An apparatus according to claim 13 wherein the cooling element removes heat from the gaseous component by directing at least some of the liquid component stream exiting the vapor-liquid separating means to a first liquid conveying means, directing the liquid component in the first liquid conveying means to a cooling jacket surrounding a conduit through which the gaseous component passes through the cooling means, directing the liquid component from said cooling jacket to a second liquid conveying means, and directing the liquid component from said second liquid conveying means to the liquid component stream.

21. An apparatus according to claim 13 wherein the gaseous component prior to passing through the cooling means is at a temperature of from about 100° to about 400° F. and the gaseous component subsequent to passing through the cooling means is at a temperature of from about 40° to about 100° F.

22. An apparatus according to claim 13 wherein the gaseous component prior to passing through the heating means is at a temperature of from about 40° to about 100° F. and the gaseous component subsequent to passing through the heating means is at a temperature of from about 60° to about 140° F.

23. An apparatus according to claim 13 wherein the gaseous component prior to passing through the cooling means is at a relative humidity of from about 50 to about 100 percent and the gaseous component subsequent to passing through the heating means is at a relative humidity of from about 5 to about 40 percent.

24. An apparatus according to claim 13 wherein the vacuum inducing means is a liquid ring pump having a seal liquid exhibiting little or no volatility at the maximum operating temperature of the pump and wherein the apparatus also comprises:

(1) a seal liquid circulation system comprising a seal liquid cooling means for cooling the seal liquid to reduce heat generated by mechanical action of the liquid ring pump, a first seal liquid conveying means for conveying the seal liquid from the liquid ring pump to the seal liquid cooling means, and a second seal liquid conveying means for conveying the seal liquid from the seal liquid cooling means to the liquid ring pump; and (2) air-seal liquid separating means to extract seal liquid from the gaseous component subsequent to passage of said gaseous component through the liquid ring pump and prior to passage of said gaseous component through the cooling means;

wherein the heating means supplies heat from the seal liquid circulation system of the liquid ring pump by extracting at least some of the seal liquid from said first seal liquid conveying means, directing said extracted seal liquid to a heating jacket surrounding a conduit through which the gaseous component passes through the heating means, and directing seal liquid from said heating jacket to said first seal liquid conveying means.

25. A process for extracting contaminants from a stream comprising a contaminant-containing mixture of liquids and gases which comprises:

(a) providing a contaminant-containing mixture of liquids and gases in fluid communication with a vacuum inducing device;

(b) separating the contaminant-containing mixture into a liquid component stream and a gaseous component;

(c) optionally removing contaminants from the liquid component stream;

(d) transporting the gaseous component through the vacuum inducing device;

(e) subsequent to transporting the gaseous component through the vacuum inducing device, cooling the gaseous component from a first temperature to a second temperature, thereby condensing liquid from the gaseous component;

(f) subsequent to cooling the gaseous component to the second temperature, heating the gaseous component to a third temperature, said third temperature being higher than said second temperature, thereby reducing the relative humidity of the gaseous component, wherein heating of the gaseous component is accomplished with heat generated by the vacuum inducing device; and (g) optionally removing contaminants from the gaseous stream subsequent to heating of the gaseous component;

wherein contaminants are necessarily removed from either the liquid component stream or the gaseous component.

26. A process according to claim 25 wherein the contaminant-containing mixture of liquids and gases is removed from a contaminated area of the ground having a water table and a vadose zone above the water table, wherein the contaminant-containing mixture is extracted from the ground through a perforated riser pipe extending downwardly from the surface of the ground to a level below the water table, wherein at least some of the perforations of the riser pipe are disposed below the water table, wherein the vacuum inducing device forms a zone of reduced pressure around said perforated riser pipe, draws soil gases and liquids into the perforated riser pipe, and conveys said soil gases and liquids to the surface as a common stream.

27. A process according to claim 26 wherein the perforations in the riser pipe are situated only below the water table.

28. A process according to claim 26 wherein the perforations in the riser pipe are situated both in the vadose zone and below the water table.

29. A process according to claim 26 wherein the perforations in the riser pipe are situated only in the vadose zone above the water table.

30. A process according to claim 25 wherein the contaminants comprise volatile organic compounds.

31. A process according to claim 25 wherein contaminants are removed from the gaseous stream with at least one carbon filter.

32. A process according to claim 25 wherein cooling is accomplished with a cooling element having a cooling jacket surrounding a conduit through which the gaseous component passes through the cooling element, said cooling jacket receiving liquid from the liquid component stream produced subsequent to separation of the contaminant-containing mixture into a liquid component stream and a gaseous component, and said cooling jacket reintroducing said liquid into the liquid component stream.

33. A process according to claim 25 wherein said first temperature is from about 100° to about 400° F and said second temperature is from about 40° to about 100° F.

34. A process according to claim 25 wherein said second temperature is from about 40° to about 100° F. and said third temperature is from about 60° to about 140° F.

35. A process according to claim 25 wherein the relative humidity of the gaseous component at the first temperature is from about 50 to about 100 percent and the relative humidity of the reduced-relative-humidity gas component at the third temperature is from about 5 to about 40 percent.

36. A process according to claim 25 wherein the vacuum inducing device is a liquid ring pump having a seal liquid exhibiting little or no volatility at the maximum operating temperature of the pump and wherein:

(1) the liquid ring pump is equipped with a seal liquid heat exchanger receiving seal liquid from said liquid ring pump through a first seal liquid conduit, cooling the seal liquid, and reintroducing the seal liquid into the liquid ring pump through a second seal liquid conduit; and (2) the gaseous component is passed through an air-seal liquid separator subsequent to passing through the liquid ring pump, said air-seal liquid separator extracting seal liquid from the gaseous component prior to cooling;

wherein the heating of the gaseous component is accomplished with heat from the seal liquid circulation system of the liquid ring pump by extracting at least some of the seal liquid from said first seal liquid conduit, directing said extracted seal liquid to a heating jacket surrounding a heating conduit through which the gaseous component passes, and directing seal liquid from said heating jacket to said first seal liquid conduit.

* * * * *